US008839386B2

(12) United States Patent
Gilboy

(10) Patent No.: US 8,839,386 B2
(45) Date of Patent: Sep. 16, 2014

(54) METHOD AND APPARATUS FOR PROVIDING AUTHENTICATION

(75) Inventor: Christopher P. Gilboy, Freehold, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1601 days.

(21) Appl. No.: 11/949,452

(22) Filed: Dec. 3, 2007

(65) Prior Publication Data
US 2009/0144810 A1 Jun. 4, 2009

(51) Int. Cl.
*H04L 29/06* (2006.01)

(52) U.S. Cl.
CPC .............. *H04L 63/08* (2013.01); *H04L 63/18* (2013.01)
USPC ............................................................ 726/7

(58) Field of Classification Search
CPC ................................. H04L 63/08; H04L 63/18
USPC ........................................................ 726/7, 3, 5
See application file for complete search history.

(56) References Cited

U.S. PATENT DOCUMENTS

| | | | |
|---|---|---|---|
| 7,287,270 B2 * | 10/2007 | Kai .................................... | 726/2 |
| 7,290,286 B2 * | 10/2007 | Moharram et al. ............... | 726/27 |
| 7,373,515 B2 * | 5/2008 | Owen et al. ..................... | 713/182 |
| 7,546,276 B2 * | 6/2009 | Randle et al. .................... | 705/65 |
| 7,765,580 B2 * | 7/2010 | Vandergeest et al. ............. | 726/2 |
| 8,296,562 B2 * | 10/2012 | Williams et al. ............... | 713/155 |
| 8,365,258 B2 * | 1/2013 | Dispensa ........................... | 726/5 |
| 8,434,133 B2 * | 4/2013 | Kulkarni et al. .................. | 726/7 |
| 8,474,028 B2 * | 6/2013 | Kulkarni et al. .................. | 726/9 |
| 2002/0169988 A1 * | 11/2002 | Vandergeest et al. .......... | 713/201 |
| 2004/0030935 A1 * | 2/2004 | Kai ................................. | 713/202 |
| 2004/0187018 A1 * | 9/2004 | Owen et al. ..................... | 713/200 |
| 2005/0234854 A1 * | 10/2005 | Jang .................................... | 707/1 |
| 2005/0251680 A1 * | 11/2005 | Brown et al. .................. | 713/171 |
| 2005/0268107 A1 * | 12/2005 | Harris et al. ................... | 713/182 |
| 2007/0136573 A1 * | 6/2007 | Steinberg ....................... | 713/155 |
| 2007/0143831 A1 * | 6/2007 | Pearson et al. ..................... | 726/5 |
| 2007/0271598 A1 * | 11/2007 | Chen et al. ......................... | 726/4 |
| 2007/0294528 A1 * | 12/2007 | Shoji et al. .................... | 713/159 |
| 2008/0086764 A1 * | 4/2008 | Kulkarni et al. .................. | 726/7 |
| 2008/0086767 A1 * | 4/2008 | Kulkarni et al. .................. | 726/9 |
| 2008/0086770 A1 * | 4/2008 | Kulkarni et al. ................ | 726/20 |
| 2008/0098464 A1 * | 4/2008 | Mizrah ............................. | 726/5 |
| 2008/0098466 A1 * | 4/2008 | Yoshida et al. .................... | 726/5 |
| 2008/0120711 A1 * | 5/2008 | Dispensa ........................... | 726/7 |
| 2008/0141353 A1 * | 6/2008 | Brown ............................... | 726/7 |
| 2008/0181197 A1 * | 7/2008 | Yin et al. ....................... | 370/352 |
| 2008/0281737 A1 * | 11/2008 | Fajardo ........................... | 705/35 |
| 2008/0282331 A1 * | 11/2008 | Teo .................................... | 726/6 |
| 2008/0291900 A1 * | 11/2008 | Yin et al. ....................... | 370/352 |
| 2008/0295159 A1 * | 11/2008 | Sentinelli .......................... | 726/6 |
| 2009/0239502 A1 * | 9/2009 | Dempo et al. ................. | 455/411 |
| 2009/0288159 A1 * | 11/2009 | Husemann et al. ............. | 726/16 |
| 2009/0319797 A1 * | 12/2009 | Tornqvist ...................... | 713/176 |

(Continued)

*Primary Examiner* — David Garcia Cervetti

(57) ABSTRACT

A method and apparatus for providing authentication are disclosed. For example, the method receives a request from a customer to access a service via a first user endpoint device, and sends a first authentication request to the customer for first authentication information. The method then sends a second authentication request to the customer for second authentication information via a second user endpoint device if the first authentication information is received, wherein the first user endpoint device is different from the second user endpoint device. The method then enables the customer to proceed with accessing the service if the second authentication information is received.

18 Claims, 4 Drawing Sheets

(56) References Cited

U.S. PATENT DOCUMENTS

| | | | |
|---|---|---|---|
| 2010/0042838 A1* | 2/2010 | Ho | 713/169 |
| 2010/0049975 A1* | 2/2010 | Parno et al. | 713/168 |
| 2010/0135491 A1* | 6/2010 | Bhuyan | 380/247 |
| 2011/0047605 A1* | 2/2011 | Sontag et al. | 726/7 |
| 2012/0204236 A1* | 8/2012 | Chen et al. | 726/4 |
| 2013/0185775 A1* | 7/2013 | Dispensa | 726/4 |

* cited by examiner

METHOD AND APPARATUS FOR PROVIDING AUTHENTICATION

The present invention relates generally to communication networks and, more particularly, to a method and apparatus for providing authentication over a network, e.g., an Internet Protocol (IP) network, a wireless network, etc.

BACKGROUND OF THE INVENTION

A customer may subscribe to a communications service with authentication. For example, a customer may subscribe to a Virtual Private Network (VPN) service that requires authentication of the users. For example, one method may require a user to provide a pre-configured password and/or identification when he/she attempts to access the service. However, if the user's pre-configured password and/or identification are compromised, then unauthorized users may gain access to the VPN service.

In another example, if the service being accessed is a point of sale request to purchase an item with a credit card and the pre-configured password and/or identification have been compromised, then an unauthorized user may commit a fraud using the compromised credit card. In addition, some vendors may not check signatures unless the transaction is above a specific amount, e.g., above $100, and so on. Unless the fraud or breach is detected quickly, the legitimate user may not realize that the credit card or his subscribed service has been compromised for a period of time.

SUMMARY OF THE INVENTION

In one embodiment, the present invention discloses a method and apparatus for providing authentication over a network, e.g., an Internet Protocol (IP) network, a wireless network, etc. For example, the method receives a request from a customer to access a service via a first user endpoint device, and sends a first authentication request to the customer for first authentication information. The method then sends a second authentication request to the customer for second authentication information via a second user endpoint device if the first authentication information is received, wherein the first user endpoint device is different from the second user endpoint device. The method then enables the customer to proceed with accessing the service if the second authentication information is received.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing authentication over a packet network, e.g., an Internet Protocol (IP) network, a wireless network, etc.

Figure 1:
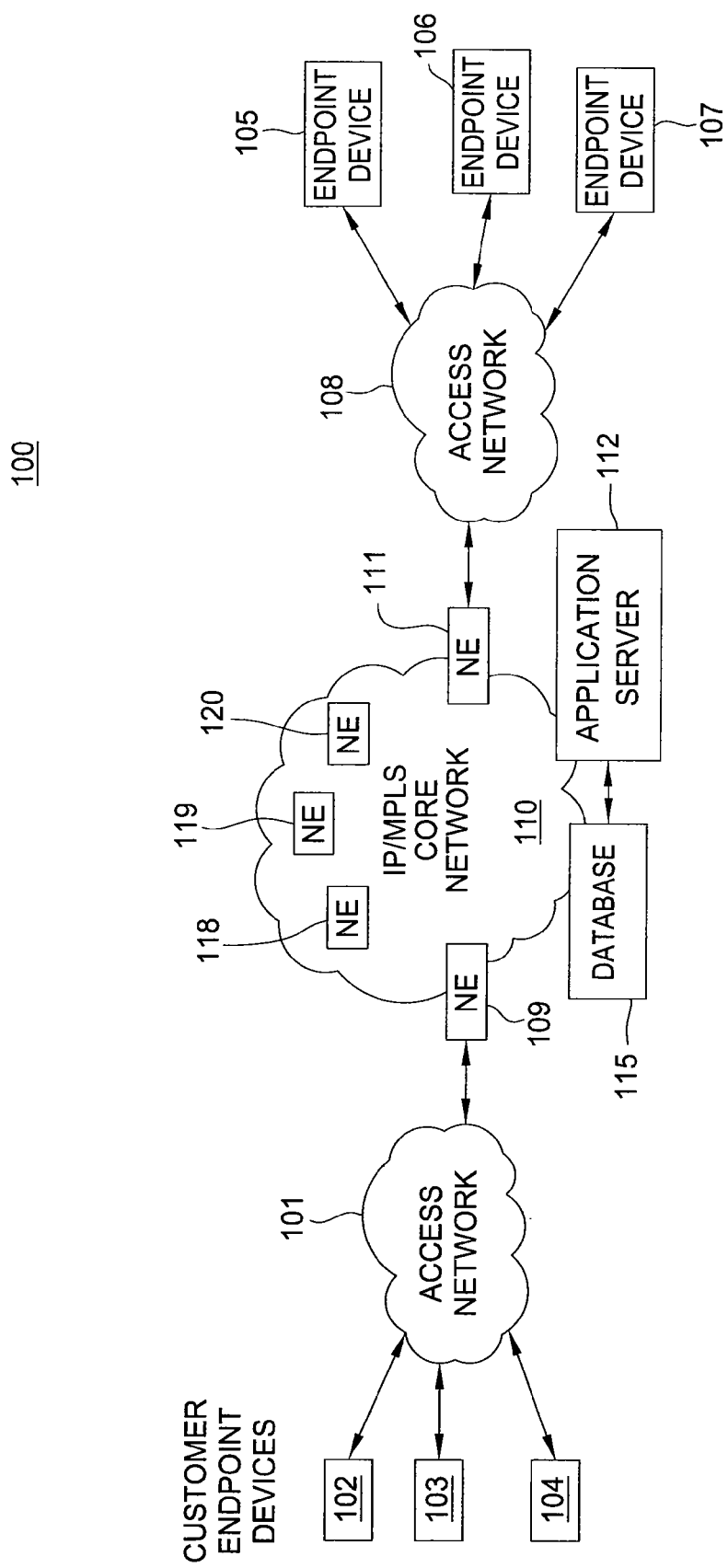
FIG. 1 illustrates an exemplary network related to the present invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The IP/MPLS core network 110 also comprises an application server 112 that interacts with a database 115. The application server 112 may comprise any server or computer that is well known in the art, and the database 115 may be any type of electronic collection of data that is also well known in the art. Those skilled in the art will realize that although only six endpoint devices, two access networks, and five NEs are depicted in FIG. 1, the communication system 100 may be expanded by including additional endpoint devices, access networks, border elements, etc. without altering the present invention.

It should be noted that the above IP network is described only to provide an illustrative environment in which packets for voice and data services are transmitted on networks. A customer may subscribe to a communications service from a network service provider. However, if the customer's endpoint device and/or the customer's authentication information are compromised, then unauthorized users may gain access to the service.

In one embodiment, the present invention discloses a method and apparatus for providing authentication. Specifically, the method establishes two diverse communications paths for authenticating the user. Thus, when a customer subscribes to a service having an authentication requirement, the network service provider may prompt the customer to select two distinct methods for authentication before the customer is allowed to access the service. For example, a network service provider may request a subscriber who is accessing service via a first endpoint device (e.g., a computer) to provide a second endpoint device (e.g., a portable endpoint device, e.g. a cellular phone, PDA, pager, etc.) where a second authentication message may be sent.

To illustrate, when the customer requests to access a service with an authentication requirement, the method may prompt the customer for a first authentication information. For example, the method may prompt for an Identification and/or password, PIN number, etc. If a valid response is received for the first authentication request, then the method may retrieve the user-defined information for the second authentication. More specifically, the method will determine the type of authentication and/or user endpoint device selected by the customer for the second authentication. For example, the customer may have selected a cellular telephone, a pager, a PDA, etc. as the user endpoint device for implementing the second authentication. As such, as part of the subscription procedure, the customer would have defined the second endpoint device type and the manner in which the second endpoint device can be reached, e.g., a phone number, an email address, and so on.

The method may then continue with the authentication procedure by launching an authentication request for the second authentication. For the example above, the method may send an authentication request to the customer's cellular telephone. Again, the method may prompt for an Identification and/or password, PIN number, etc. If a valid response is received for the second authentication request, the method then enables the customer to proceed with accessing the service.

For example, if the service being accessed is a point of sale transaction using a credit card, then the customer may choose a message, e.g., a text message, to be sent to his/her cellular phone for the second authentication before the point of sale transaction is accepted. Responding to the second authentication request may require a response via the second user endpoint device as defined by the customer. The response can be a password or pin that is only known by the customer. For example, a customer may have to enter a code that is difficult to guess (e.g., a password previously chosen by the customer) via a wireless endpoint device prior to being allowed to proceed with accessing service. The code may be setup when the service was initially configured.

Alternatively, a customer may simply indicate a confirmation (e.g., a yes response) by pressing a specific key or a denial (e.g., a no response) by pressing another key to indicate that he is or is not executing a sale transaction. This second approach minimizes the need for the customer having to remember a second set of authentication information. The fact that the customer is responding to a simple question interactively at a current time via the second endpoint device may be sufficient to indicate that the request for service is legitimate. Thus, stealing a customer's sign-on identification and password or even the customer's physical access card (e.g., a credit card) alone will not be sufficient for an unauthorized user to gain access to the subscribed service.

Figure 2:
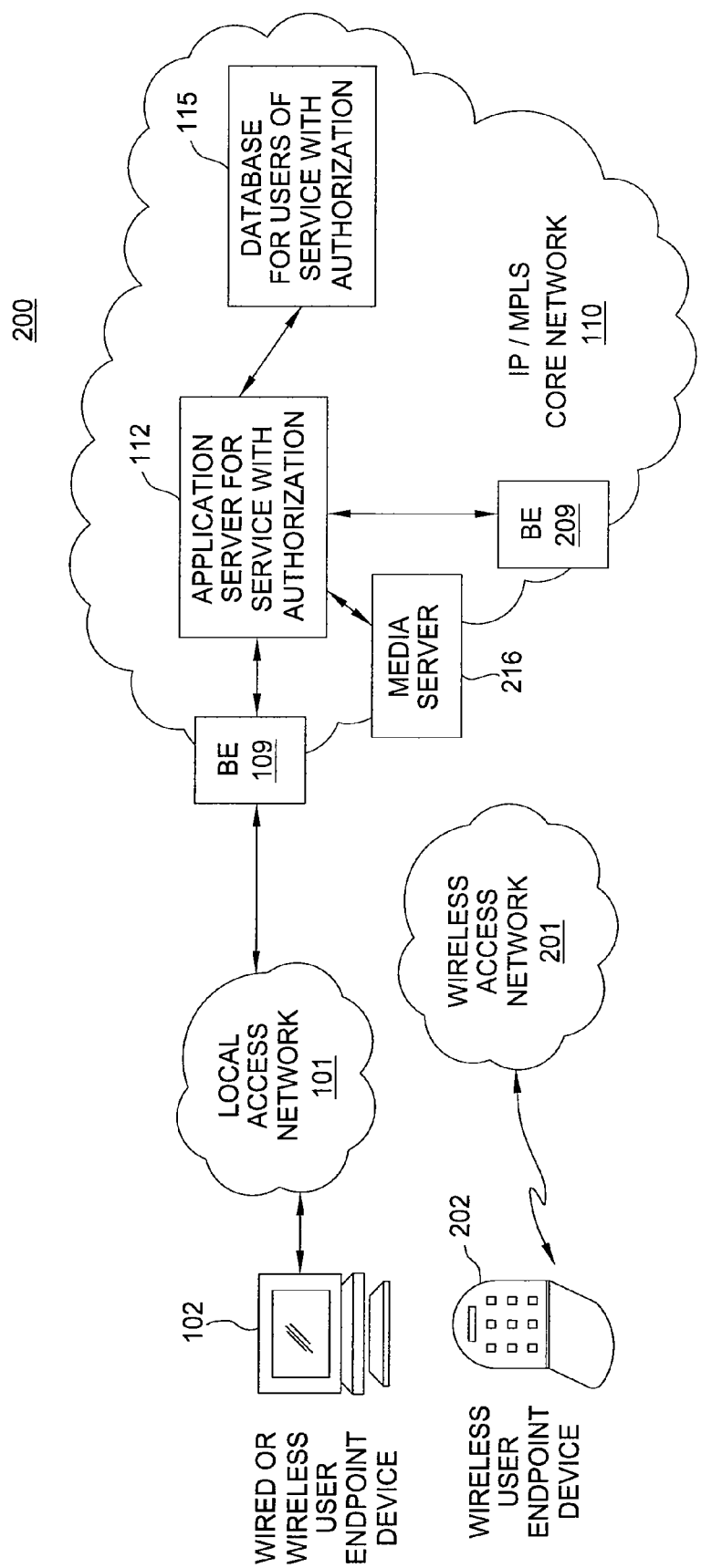
FIG. 2 illustrates an exemplary network with authentication.

FIG. 2 illustrates an exemplary network 200 for implementing the authentication method of the present invention. The illustrative network 200 comprises a wired or wireless user endpoint device 102, a wireless user endpoint device 202, an access network 101 such as a cable or DSL broadband access network, a wireless access network 201, and an IP/MPLS core network 110. In one embodiment, the IP/MPLS core network 110 comprises a plurality of border elements 109 and 209, an application server 112 for one or more services with authentication, a media server 216, and a database for services with authentication 115.

The user endpoint device 102 is able to communicate with the IP/MPLS core network 110 through the local access network 101 and border element 109. The wireless user endpoint device 202 is able to communicate with the IP/MPLS core network 110 through the wireless access network 201 and border element 209.

In one embodiment, the application server 112 may utilize the media server 216 for communicating with user endpoint devices 102 and 202 in a format compatible with the user endpoint device. For example, one user endpoint device may be able to process information in both graphics and text format while another user endpoint device may only process information in text format. In another example, the media server 216 may be used to provide a web page interface to the user, e.g., a Hyper-Text Markup Language (HTML) page and the like.

For example, a customer may utilize the user endpoint device 102 to communicate with application server 112 for subscribing to a service with authentication (e.g., requiring an authentication procedure to be completed in order to gain access to the subscribed service). Generally, the authentication procedure will require that a first authentication method or step be fulfilled by the customer. The format and/or communication channel of such first authentication method is often dictated by the service provider and cannot be altered by the customer. For example, the service provider may require that a customer accesses a particular URL and then provide the proper log-on user name and password. Although the customer may define the characters to be used for the log-on user name and the password, this first authentication method or step does not allow the customer to define the format and/or communication channel to be used.

In turn, the application server 112 will prompt the customer to select a second method of authentication, i.e., to provide a second user endpoint device and/or the format to be used with the second user endpoint device. It should be noted that this second authenticated method or step is user-definable. For example, the customer may choose to receive an Instant Massage (IM) at the wireless user endpoint device 202, as a second method of authentication. The application server 112 may then store the selected second method of authentication (e.g., receiving an IM message, receiving a telephone call, and the like) and endpoint device information (e.g., the type of user endpoint device) at the database 115. For example, the database 115 may contain a list of customers. For each customer, the database will store a selected second authentication format (IM, phone call, etc.), a selected endpoint device type and associated contact information, e.g., a wireless phone number, an email address, and so on.

Once the authentication parameters have been defined, when the customer at a later session requests to access the service, the application server 112 will prompt the customer for the first authentication information such as a password and/or a PIN to be entered via the user endpoint device 102. If a valid response (password and/or PIN) is received from the user endpoint device 102, the method may then retrieve the information for the second authentication from the database 115. The method then generates a second authentication request for the second authentication. For the example above, the method will send a second authentication request to the wireless user endpoint device 202. If a valid response is received from the customer for the second authentication request via the wireless endpoint device 202, then the method enables the customer to proceed with accessing the service via the user endpoint device 102.

It should be noted that in one embodiment, the second authentication method is implemented using a different endpoint device (broadly a second user endpoint device) from the endpoint device (broadly a first user endpoint device) that was used in responding to the first authentication request. Furthermore, in one embodiment, the second authentication method is implemented automatically without the interaction of a live agent.

In yet another alternate embodiment, the second authentication request may be received via the second user endpoint device, but a response to the second authentication request may be provided via the first user endpoint device. For example, the second authentication request may simply be a string of arbitrarily chosen characters (e.g., alphanumeric characters, symbols, and the like) that is provided to the second user endpoint device. Upon receipt of the string of characters in real time, the customer may simply enter the received string of characters via the first user endpoint device, where it is presented back to the service provider. In other words, the second authentication request may contain information to be used for continuing to access the service. The customer simply reads the provided string of characters, enters the string of characters via the first user endpoint device (e.g., a computer, a keypad for a point of sale transaction, etc.), and proceeds with the transaction. This approach will indicate to the service provider that the customer is currently in possession of the second user endpoint device and that the customer is able to use the received information to fulfill the requirement of the second authentication method.

Figure 3:
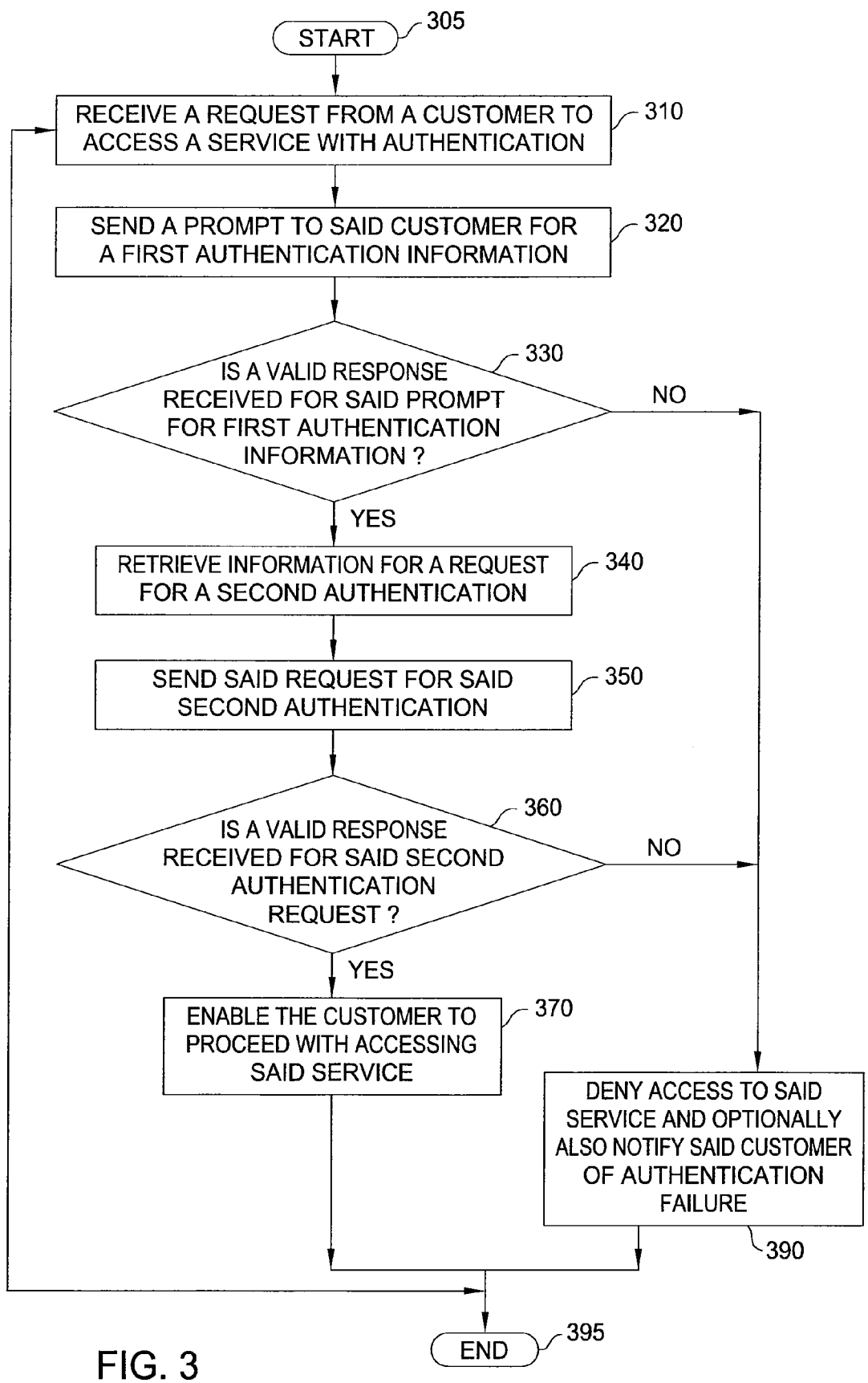
FIG. 3 illustrates a flowchart of a method for providing authentication.

FIG. 3 illustrates a flowchart of a method 300 for providing authentication. Method 300 starts in step 305 and proceeds to step 310.

In step 310, method 300 receives a request from a customer to access a service with authentication. For example, an application server for a service receives a request from a first user endpoint device to access a service with authentication.

In step 320, method 300 sends a prompt (e.g., a first authentication request) to the customer to provide a proper authentication response (e.g., first authentication information). For example, the method sends a request to the customer to provide one or more of: a user name, a password, an Identification (ID), a Personal Identification Number (PIN), etc.

In step 330, method 300 determines whether a valid response is received for the prompt for first authentication information. For example, the method determines whether a valid user name, a valid password, a valid identification, and/or a valid PIN, has been received. If a valid response is received for the prompt for first authentication information, the method proceeds to step 340. Otherwise, the method proceeds to step 390.

In step 340, method 300 retrieves information for generating a request for a second authentication. For example, the method retrieves the format of the second authentication, the second user endpoint device type, and the contact information (e.g., telephone number, email address, etc.) to reach the second user endpoint device.

In step 350, method 300 sends a second authentication request for the second authentication. For example, the method may send a prompt to the customer's wireless user endpoint device requesting the customer to indicate whether or not he/she has requested to access the service. For example, a second authentication request may simply ask the customer to enter "y" for yes or "n" for no to a question "Did you initiate the request to access the service?"

In step 360, the method determines whether a valid response is received for the second authentication request. If a valid response (confirmation) is received from the customer for the second authentication request, the method proceeds to step 370. Otherwise, the method proceeds to step 390.

In step 370, method 300 enables the customer to proceed with accessing the service. For example, if the customer confirms that he/she is the one requesting to access the service, then the method allows the customer to proceed with accessing the service. The method then proceeds to step 395 to end processing the current request and to step 310 to continue receiving requests for service.

In step 390, method 300 denies access to the service and optionally also notifies the customer of the authentication failure. The notification may assist the customer in quickly realizing that an unsuccessful attempt was made to access the customer's subscribed service. The method then proceeds to step 395 to end processing the current request or returns to step 310 to continue receiving requests for service.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
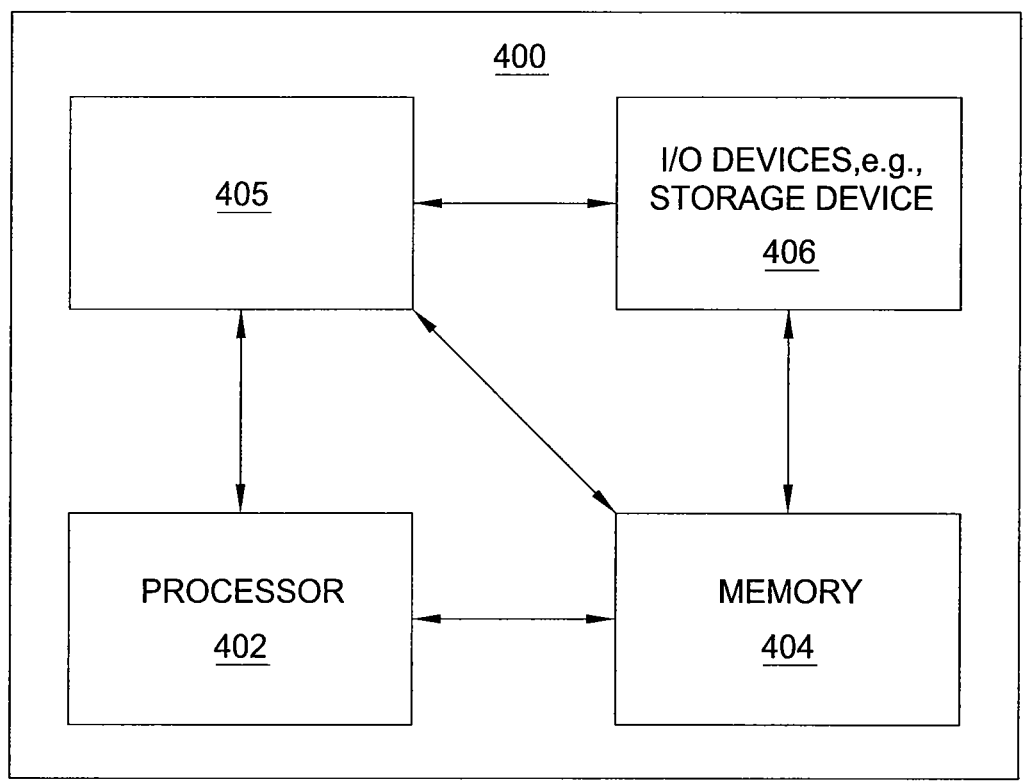
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing authentication, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing authentication can be loaded into memory 404 and executed by processor 402 to implement the functions as discussed above. As such, the present method 405 for providing authentication (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing authentication, comprising:
   receiving, via a processor, a request from a customer to access a service via a first user endpoint device;
   sending, via the processor, a first authentication request to the customer for a first authentication information;
   receiving, via the processor, the first authentication information;

determining, via the processor, a type of authentication for a second authentication request to be sent to a second user endpoint device;

launching, via the processor, the second authentication request to the customer for a second authentication information to the second user endpoint device that is triggered when the first authentication information is received from the first user endpoint device via a first access network, wherein the first user endpoint device is different from the second user endpoint device; and enabling, via the processor, the customer to proceed with accessing the service when the second authentication information is received from the second user endpoint device via a second access network, wherein the first access network and the second access network are different.

2. The method of claim 1, wherein the first authentication information comprises an identification.

3. The method of claim 1, wherein the second authentication information comprises an identification.

4. The method of claim 3, wherein the second authentication information is previously defined by the customer.

5. The method of claim 1, wherein the second authentication request comprises a string of characters.

6. The method of claim 5, wherein the second authentication information comprises the string of characters.

7. The method of claim 1, wherein the second user endpoint device is a wireless user endpoint device.

8. The method of claim 1, wherein a format of the second authentication request is defined by the customer.

9. The method of claim 8, wherein the format of the second authentication request comprises a telephone call.

10. The method of claim 1, wherein a type of the second user endpoint device is defined by the customer.

11. The method of claim 1, further comprising:
notifying the customer when the second authentication information is not received.

12. A non-transitory computer-readable medium storing a plurality of instructions which, when executed by a processor, cause the processor to perform a method operations for authentication, the operations comprising:
receiving a request from a customer to access a service via a first user endpoint device;
sending a first authentication request to the customer for a first authentication information;
receiving the first authentication information;
determining a type of authentication for a second authentication request to be sent to a second user endpoint device;
launching the second authentication request to the customer for a second authentication information to the second user endpoint device that is triggered when the first authentication information is received from the first user endpoint device via a first access network, wherein the first user endpoint device is different from the second user endpoint device; and
enabling the customer to proceed with accessing the service when the second authentication information is received from the second user endpoint device via a second access network, wherein the first access network and the second access network are different.

13. The non-transitory computer-readable medium of claim 12,
wherein the first authentication information comprises an identification; and
wherein the second authentication information comprises an identification.

14. The non-transitory computer-readable medium of claim 13, wherein the second authentication information is previously defined by the customer.

15. The non-transitory computer-readable medium of claim 12, wherein the second authentication request comprises a string of characters.

16. The non-transitory computer-readable medium of claim 15, wherein the second authentication information comprises the string of characters.

17. The non-transitory computer-readable medium of claim 12, wherein a format of the second authentication request is defined by the customer.

18. An apparatus for providing authentication, comprising:
a processor; and
a computer-readable medium storing a plurality of instructions which, when executed by the processor, cause the processor to perform operations, the operations comprising:
receiving a request from a customer to access a service via a first user endpoint device;
sending a first authentication request to the customer for a first authentication information;
receiving the first authentication information;
determining a type of authentication for a second authentication request to be sent to a second user endpoint device;
launching the second authentication request to the customer for a second authentication information to the second user endpoint device that is triggered when the first authentication information is received from the first user endpoint device via a first access network, wherein the first user endpoint device is different from the second user endpoint device; and
enabling the customer to proceed with accessing the service when the second authentication information is received from the second user endpoint device via a second access network, wherein the first access network and the second access network are different.

* * * * *